Patented May 16, 1933

1,909,042

UNITED STATES PATENT OFFICE

PAUL JOHNSON CARLISLE, OF NIAGARA FALLS, NEW YORK, ASSIGNOR, BY MESNE ASSIGNMENTS, TO THE ROESSLER & HASSLACHER CHEMICAL COMPANY, A CORPORATION OF DELAWARE

CALCIUM CYANIDE

No Drawing.  Application filed October 15, 1928.  Serial No. 312,736.

This invention relates to the preparation of a pulverulent calcium cyanide product by the action of liquefied hydrocyanic acid on lime.

Calcium hydroxide will react in water with hydrocyanic acid, but it is exceedingly difficult to prepare a solid cyanide product from such a solution. Under carefully controlled conditions, it is known to be possible to make a basic calcium cyanide product in which approximately 1/3 of the calcium is present in a form equivalent to $Ca(CN)_2$ and the other 2/3 of the calcium in a form equivalent to $Ca(OH)_2$. In the preparation of this product it is necessary to use exact molecular proportions of calcium oxide, water and hydrocyanic acid to conform to the ratio 1/3 $Ca(CN)_2$ and 2/3 $Ca(OH)_2$. This corresponds to a maximum cyanogen content equivalent to about 38.33% $Ca(CN)_2$. The entire operation requires considerable care and, if either too much calcium hydroxide or hydrocyanic acid is present, the product will be unsatisfactory because of excessive polymerization of the hydrocyanic acid. Such a reaction mixture is practically a dry pulverulent mixture and therefore, it is difficult to properly control the temperature.

It is the object of the present invention to provide a process which avoids these difficulties. How this is accomplished and the resulting advantages will become clear as the process is described.

I have discovered that hydrocyanic acid is not polymerized to an appreciable extent if powdered calcium oxide is suspended in anhydrous liquid hydrocyanic acid. However, the reaction is very slow and after several hours the product will contain only from 10 to 15% by weight of the equivalent of calcium cyanide. If a small amount of water, for example 2% by volume of the hydrocyanic acid, is added the reaction proceeds much more rapidly and is practically complete in one and one-half hours.

The excess hydrocyanic acid can then be evaporated under reduced pressure. If commercial burnt lime of about 90% active CaO content is used, a solid, slightly darkened, product results which has a cyanogen content equivalent to 42 to 44% $Ca(CN)_2$.

A slightly higher grade product may be prepared by decanting as much of the liquid hydrocyanic acid as possible from the reaction mixture and washing the solid product by decantation with anhydrous hydrocyanic acid. This decantation removes any traces of water held in solution by the liquid hydrocyanic acid reaction medium. The polymerization of the hydrocyanic acid can be practically entirely avoided by evaporation, under reduced pressure, of the remaining hydrocyanic acid. The product, in this case, contains from 1 to 3% more $Ca(CN)_2$ than the product not so washed. However, for many practical purposes, it is not necessary to wash the product with anhydrous hydrocyanic acid.

The solid product is a dry powder which is stable when stored out of contact with the atmosphere. When exposed to the air in thin layers hydrocyanic acid is evolved.

Examples

A. Thirty-five grams of burnt commercial lime, powdered to pass a 200 mesh screen, containing about 90% by weight of active CaO, was placed in a round-bottom flask equipped with a mechanical agitator, a thermometer, and a vapor pipe carrying a brine-cooled reflux condenser. Two hundred ccs of anhydrous liquid hydrocyanic acid (approximately 140 grams) was added to the lime in the flask and the agitator started. The temperature of the mixture was 21° C., which corresponded exactly to room temperature. Then 4 ccs of distilled water was added to the reaction mixture and within 2 minutes the temperature rose to 26.6° C. and refluxing started. At the end of one hour the temperature of the reaction mixture had dropped to 25° C. and the operation was stopped.

After settling 95 cc of clear liquid was decanted. The residual hydrocyanic acid was then evaporated under reduced pressure. The product was a light tan colored powder weighing 52.4 grams and contained cyanogen equivalent to 13.3 grams HCN or 22.6 grams Ca(CN)$_2$ which is equivalent to 43.2% by weight of calcium cyanide in the dry solid product.

B. In this experiment the reaction was carried out exactly as in example A except that after settling 96 cc of clear liquid was decanted and the reaction product was washed successively with three 50 cc portions of anhydrous liquid hydrocyanic acid. The final residual hydrocyanic acid was evaporated under reduced pressure. The product was a light tan colored powder weighing 50.9 grams and contained cyanogen equivalent to 13.3 grams HCN or 22.6 grams Ca(CN)$_2$ which is equivalent to 44.4% by weight of calcium cyanide in the dry solid product.

In order to accelerate the speed of reaction satisfactorily it is necessary to have water in the reaction mixture. The best results are secured if the water amounts to between about 1.5 to 3.5% by volume of the hydrocyanic acid. If too much water is used the reaction may become violent and difficult to control.

The advantage of using liquid hydrocyanic acid as a reaction medium is that this makes it possible easily to control the reaction. The temperature can not rise above the boiling point of the liquid if enough is used and the reflux means is efficient. The unreacted hydrocyanic acid is, of course, recovered and used in subsequent runs.

A wide variation in the amount of HCN for the liquid medium is possible and I do not limit myself in this respect. In general there must be sufficient liquid to enable ready manipulation of the mixture, i. e., agitation and temperature control. The greater the excess of liquid HCN over the calcium oxide the more easily the mixture can be stirred and local overheating avoided.

Although the examples given cover batch operation, this invention is intended to include continuous operation as well.

I am not certain as to the exact chemical composition of my cyanide product. It may contain calcium cyanide, as such, or a basic calcium cyanide. I do know, however, that the water of reaction is held in chemical combination either as calcium hydroxide or as calcium hydroxy cyanide, (Ca(OH)$_2$ or Ca(OH)CN), and that the limiting theoretical cyanide content (if pure CaO were used) corresponds to 55.4% calcium cyanide or 31.32% cyanogen (CN). In actual practice this composition is not realized because commercial lime is used and because there must be some water in the hydrocyanic acid some of which forms calcium hydroxide.

I claim:

1. Process for the manufacture of a pulverulent calcium cyanide product comprising suspending powdered unslaked lime in an excess of liquid hydrocyanic acid containing water in accelerating proportions less than about 3.5% and thereafter separating the calcium cyanide product from the excess liquid hydrocyanic acid.

2. Process for the manufacture of a pulverulent calcium cyanide product comprising suspending powdered unslaked lime in an excess of liquid hydrocyanic acid, said hydrocyanic acid containing between about 1.5 and 3.5% by volume of water, agitating the mixture during the reaction and thereafter separating the calcium cyanide product from the excess liquid hydrocyanic acid.

3. The method which comprises suspending pulverulent burnt lime in excess liquid hydrocyanic acid containing water in accelerating proportions, agitating the mixture and allowing it to react at substantially the boiling point of the hydrocyanic acid and thereafter separating the calcium cyanide product from the excess liquid hydrocyanic acid.

4. Process for the manufacture of a pulverulent calcium cyanide product comprising suspending powdered unslaked lime in an excess of liquid hydrocyanic acid containing water in accelerating proportions and thereafter separating from the resulting calcium cyanide product the major portion of the liquid hydrocyanic acid mechanically and the remainder by evaporation under reduced pressure.

5. Process for the manufacture of a pulverulent calcium cyanide product comprising suspending powdered unslaked lime in an excess of liquid hydrocyanic acid containing water in accelerating proportions and thereafter removing the major portion of the liquid hydrocyanic acid mechanically, washing the residue with successive portions of anhydrous liquid hydrocyanic acid and finally removing the residual liquid from the calcium cyanide product by evaporation under reduced pressure.

6. A pulverulent hydrated calcium cyanide composition comprising chemically associated calcium cyanide and hydroxide and having a cyanide content equivalent to about 42% to about 55% by weight of calcium cyanide.

7. A pulverulent hydrated calcium cyanide product the composition of which corresponds substantially to one OH group for each CN group present and which has a cyanide content equivalent to about 42% to 55% by weight of calcium cyanide.

Signed at Niagara Falls, in the county of Niagara and State of New York this 9th day of October A. D. 1928.

PAUL JOHNSON CARLISLE.